United States Patent [19]

Murata et al.

[11] Patent Number: 4,947,213
[45] Date of Patent: Aug. 7, 1990

[54] PROJECTION COPYING APPARATUS

[75] Inventors: Shinji Murata; Kazuhiko Onuki, both of Tokyo; Masami Maetani, Ohmiya; Kazuhide Sugiyama, Tokyo, all of Japan

[73] Assignee: Canon Kabushiki Kaisha, Tokyo, Japan

[21] Appl. No.: 449,144

[22] Filed: Dec. 13, 1989

Related U.S. Application Data

[63] Continuation of Ser. No. 196,795, May 17, 1988, abandoned, which is a continuation of Ser. No. 857,056, Apr. 29, 1986, abandoned.

[30] Foreign Application Priority Data

| May 16, 1985 | [JP] | Japan | 60-105293 |
| May 16, 1985 | [JP] | Japan | 60-105294 |
| May 16, 1985 | [JP] | Japan | 60-105295 |
| May 23, 1985 | [JP] | Japan | 60-111215 |

[51] Int. Cl.⁵ .................. G03G 21/00; G03B 13/28
[52] U.S. Cl. ............................. 355/271; 355/45; 355/233
[58] Field of Search ............... 355/200, 210, 232, 233, 355/271, 44, 45

[56] References Cited

U.S. PATENT DOCUMENTS

| 3,612,678 | 10/1971 | Haslam et al. | 355/271 |
| 3,907,418 | 9/1975 | Okuyama | 355/271 X |
| 4,170,412 | 10/1979 | Grace et al. | 355/271 |
| 4,212,532 | 7/1980 | Suzuki | 355/233 X |
| 4,367,033 | 10/1983 | Watanabe | 355/271 |
| 4,589,761 | 5/1986 | Landa | 355/235 |
| 4,616,921 | 10/1986 | Matson et al. | 355/271 |

Primary Examiner—Fred L. Braun
Attorney, Agent, or Firm—Fitzpatrick, Cella, Harper & Scinto

[57] ABSTRACT

A projection copying apparatus having an image forming lens, a first reflection member opposed to the lens, a reader optical path lens system and a printer optical path lens system. The reader optical path lens system includes a movable reflection member, and projects an image onto a screen when the apparatus is in a reading mode. When the apparatus is in a printing mode, a driving device moves the printer optical path lens system in such a manner to reflect light from the first reflection member onto a photosensitive medium. The movable reflection member is moved in and out of a reflection light path of the first reflection member to change the apparatus between the reading mode and the printing mode.

17 Claims, 5 Drawing Sheets

PROJECTION COPYING APPARATUS

This application is a continuation of application Ser. No. 196,795 filed May 17, 1988, which is a continuation of application Ser. No. 857,056, filed Apr. 29, 1986, both of which are now abandoned.

BACKGROUND OF THE INVENTION

1. Field of the Invention

The present invention relates to a projection copying apparatus of a type in which an original image is projected on an exposure station through an optical system.

2. Related Background Art

Such an apparatus is used in a microfilm reader-printer and the like in which an image of an original such as a film is projected onto an exposure station through an image-forming lens system. Various image projection systems have been proposed for this type of apparatus.

In one of the known image projection systems (U.S. Pat. No. 4,367,033), three mirrors are arranged on the image field side of the image-forming lens to successively reflect a portion of the image-forming light beam so that an image of a slit-like portion of the original can be formed on a photosensitive medium in the exposure section. To perform the slit exposure, the first and second mirrors lying nearer to the lens are moved in a determined direction while moving the photosensitive medium passing through the exposure section at a constant speed.

This image projection system, however, has some problems. The first mirror which directly faces the image-forming lens is moved. Therefore, when the moving mirror is to be positioned close to the lens, the mirror is required to have a high degree of surface precision. If the precision of mirror surface is low, the image projected on the image plane is low in quality. Furthermore, as the first mirror, a large mirror is needed, which leads to a large size of apparatus as a whole. In addition, the oscillation of the first mirror has an adverse effect on the quality of images. Because of it, good quality cannot be attained for copied images with this known system.

It is also known to arrange not three but two mirrors on the image field side of the image-forming lens (German patent application Laid Open No. 2,915,512; Japanese patent application Laid Open No. 24,135/1983). However, like the first-mentioned prior art system, this prior art system also has the moving mirror at a position near the image-forming lens. Therefore, this known system has the same problems as described above.

In the conventional microfilm reader-printer, the optical path for magnifying and projecting an image of a microfilm onto a screen is called "reader optical path" and the optical path for projecting and exposing the image on a photosensitive medium to copy the image is called "printer optical path".

In some known microfilm reader-printers, a part of the reader optical path is used also as a part of the printer optical path (U.S. Pat. No. 4,367,033; German patent application Laid Open No. 2,915,512; U.S. Ser. No. 777,028).

In order to expose the image on the photosensitive medium, a scan-exposure method is often used according to which a scanning optical system constituting the printer optical path is moved to carry out scanning for exposure. When this scan-exposure method is employed in the above-mentioned type of reader-printer, there is produced a difficult problem. As the scanning optical system belonging to the printer section is moved, the printer section has to have a particular space used only for it independently of the space only for the, reader section. Because of these spaces, the apparatus, by necessity, has a large size. In the apparatus, the optical system belonging to the reader section and the scanning optical system belonging to the printer section are spaced a large distance from each other, which renders it very difficult to align the scanning direction of the scanning optical system with the optical system of the reader section. In the alignment, it is essential to hold a determined angular relation between the scanning direction and the reader optical system. If the moving direction of the scanning optical system is deviated from the direction of the determined angle and any deviation of the optical axis of the printer optical path is caused thereby, it is no longer possible to faithfully copy the image on a copy paper.

A known method for changing over the mode of the above-mentioned apparatus between reader mode and printer mode is to provide an optical path changeover mirror in the common optical path. The changeover mirror is turned out from and turned into the optical path for changing over the optical path between reader optical path and printer optical path. Obviously, this method needs a particular driving mechanism for rotationally moving the changeover mirror. It leads to a large, complicated and expensive apparatus.

A slit exposure type microfilm reader-printer is also known in the art in which two scanning mirrors are arranged in the printer optical path. A portion of the image-forming light beam is successively reflected by these scanning mirrors to form an image of a slit-like portion of the original on a photosensitive medium. The photosensitive medium is moved passing through the exposure section at a constant speed while moving the scanning mirrors in a determined direction to perform the slit exposure on the photosensitive medium. This type of reader-printer also has some drawbacks.

If the scanning mirrors run away accidentally during the reader mode time or if there is an timing lag between the moving of the scanning mirrors and the turning of the changeover mirror, any or all of the mirrors may be broken by collision between them or, in the worst case, the apparatus may be totally broken.

SUMMARY OF THE INVENTION

Accordingly, it is the general object of the present invention to overcome the drawbacks involved in the prior art apparatus as mentioned above.

More specifically, it is an object of the invention to provide a projection copying apparatus in which the reflection member nearest to the image-forming lens is not required to have so high precision of reflecting surface without any possibility of degradation of image quality by it.

It is another object of the invention to provide a projection copying apparatus which is small in size and able to produce high quality images consistently.

It is a further object of the invention to provide a projection copying apparatus which is simple in construction and free from the danger of breakage of the optical system and/or damage of the apparatus.

Other and further objects, features and advantages of the invention will appear more fully from reading the

DESCRIPTION OF THE PREFERRED EMBODIMENTS

Figure 1:
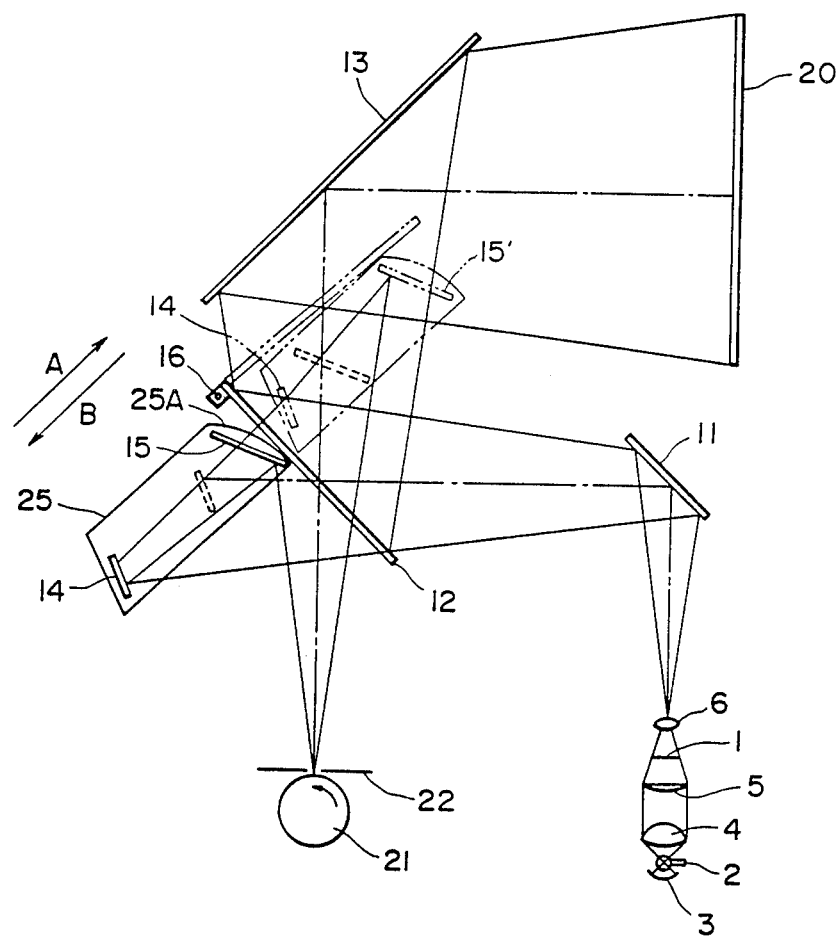
FIG. 1 is a schematic view of a reader-printer in which the present invention has been embodied.

FIG. 1 shows a reader-printer in which the present invention has been embodied.

In FIG. 1, the reference character 1 denotes a microfilm and 2 does a lamp. Designated by 3 is a reflector, 4 is a condenser lens, 5 is a field lens and 6 is a focusing lens.

A one frame image of the microfilm 1 is illuminated throughout by the lamp 2 and the illuminated one frame image is projected to a reader optical path or a printer optical path through the focusing lens 6.

The reader optical path comprises a first reflecting mirror 11, a moving reflecting mirror 12 which is used for changing over the optical path and a stationary reflecting mirror 13. On the other hand, the printer optical path is constituted of the first reflecting mirror 11, a second reflecting mirror 14 and a third reflecting mirror 15.

The mirrors 11, 12 and 13 are disposed 45° inclined relative to the optical axis of the focusing lens 6. The mirrors 11 and 13 are fixed at the positions shown in the drawing whereas the mirror 12 is rotationally movable about the axis 16. When the mirror 12 is in the position indicated by a solid line, it forms the reader optical path. In the position suggested by a phantom line the mirror 12 forms the printer optical path.

The second and third mirrors 14 and 15 are so disposed that their reflecting surfaces form an angle of 45° to each other. The mirrors 14 and 15 can be moved as a unit reciprocally between two positions shown in solid and in phantom in the directions indicated by arrows A and B.

Designated by 20 is a transmission type screen, 21 is a photosensitive drum provided in the exposure section and 22 is a slit plate.

In the reader mode, the moving mirror 12 is kept still in the solid position and the second and third mirrors 14 and 15 are in the solid positions behind the mirror 12. The image light of the microfilm transmitted through the focusing lens 6 is projected on the screen 20 through the mirrors 11, 12 and 13.

In the printer mode, the moving mirror 12 is rotated counter-clockwise up to the phantom position out of the light path. The second and third mirrors 14 and 15 are moved together at first in the direction of arrow A up to the exposure positions 14' and 15' suggested by phantom, and then moved in the reversed direction, namely in the direction of arrow B from the exposure positions.

During the movement in the direction B, the light of image reflected by the mirrors 11, 14 and 15 is projected on the drum 21. In other words, with the movement of the second and third mirrors 14 and 15 and through the slit 22, the film image is scan-exposed on the photosensitive drum 21 now rotating counter-clockwise. The scan-exposure of the image is ended at the time when the second and third mirrors 14 and 15 come near the solid positions. Thereafter, the moving mirror 12 is returned to the solid position and thereby the mode is changed over to the reader mode.

In order to carry out the scan-exposure, the second and third mirrors 14 and 15 are moved in the direction of arrow at a speed of $1/\sqrt{2}$ of the peripheral speed of the rotating drum 21.

Although not shown in the drawing, a set of image-forming means such as chargers, developing device, transfer device etc. are arranged around the photosensitive drum 21 to perform copying according to the known electro-photographic method.

The magnification of copy may be changed by any known technique, for example, by exchanging the focusing lens for another. Even when the magnification is changed, there is no need of changing the running speed of the mirrors 14 and 15. The running speed can be left at the fixed value irrespective of magnification.

Also, in the exposure section, there may be used a one-dimensional image sensor (such as CCD) instead of the photosensitive drum 21. In this case, copied images may be obtained by transmitting the outputs of the image sensor to a laser beam printer.

To move the mirrors 14 and 15 in the above-mentioned direction at the above-mentioned speed, a support plate 25 is movably mounted and is connected with the drum-driving motor through a wire (not shown). The second and third mirrors 14 and 15 are fixed on the support plate 25 which is driven by the motor to move along a rail (not shown) in the directions indicate by arrows A and B. The mirror-carrying plate 25 has a curved cam surface 25A formed at the right side end of the plate. The back surface of the moving mirror 12 is steadily pressed against the cam surface 25A under the action of a spring (not shown) or gravity.

When the operator depresses a print button to start printing, the support plate 25 is moved in the direction of arrow A from the solid position to the phantom position. Thereby the second and third mirrors 14 and 15 are moved, as a unit, obliquely upwards. At the same time, the mirror 12 which is in abutment with the cam surface of the moving support plate 25, is moved up and rotated in a counter-clockwise direction with the movement of the support plate. When the second and third mirrors 14 and 15 reach the exposure start positions 14' and 15' suggested by phantom, the moving support plate 25 is stopped and the mirror 12 is positioned in the position suggested by phantom out of the projection light path. At the next step, the support plate 25 moves in the reverse direction indicated by arrow B. Accordingly, the second and third mirrors 14 and 15 move obliquely downwards and the mirror 12 rotates in a clockwise direction. With this movement of the mirrors 14 and 15 from the phantom position to the solid position, the image of the microfilm is exposed on the photosensitive drum 21. The exposure is ended when the mirrors 14 and 15 reach the solid position. At the same time, the moving mirror 12 comes back to the solid position and the mode is returned to the reader mode.

As described above, in the printer mode, he mirror 12 is rotated by the support plate 25. At the time, the mirror is very smoothly moved up by the cam surface 25A of the support plate 25. The latter also can move smoothly. Even when the support plate 25 is erroneously moved in the reader mode, there is no fear of mirrors being broken by collision between mirrors, because the moving mirror 12 is rotated simultaneously with the movement of the support plate 25. The use of the support plate provided with the cam surface 25A brings forth another advantage that no particular driving mechanism is needed for rotating the moving mirror. This enables simplification of a surface of the apparatus.

Figure 2:
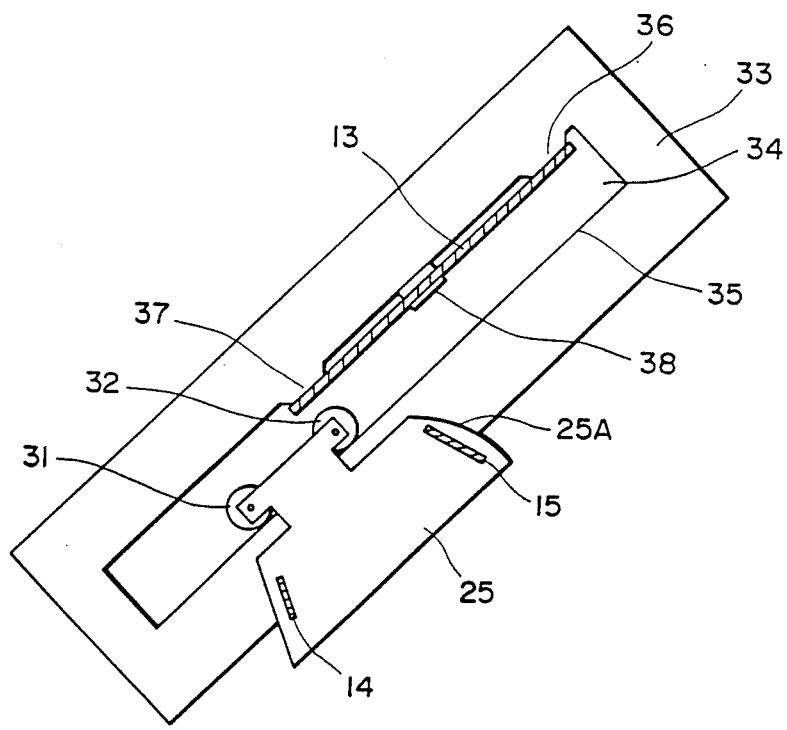
FIG. 2 is a sectional view of the mirror-moving mechanism.

FIG. 2 shows the construction of the scanning mirror moving mechanism.

The second and third mirrors 14 and 15 are fixed on the moving box-like support plate 25 forming an angle of 45° therebetween. The bottom of the box-like support plate 25 (referred to also as carrier) is open. At the upper end, the carrier 25 has two pairs of rollers 31 and 32. Although only one end of the carrier 25 is seen in FIG. 2, it is to be understood that the carrier 25 has the same structure on the other end. Designated by 33 is a side plate of the apparatus. The side plate 33 has a rectangular opening 34 with a rail 35 formed on the sloped lower surface. The pair of rollers 31 and 32 are on the rail 35 and can move rolling along the rail. On the sloping upper surface of the opening 34 there are formed two projections 36 and 37 against which the stationary mirror 13 is pressed by a spring 38.

Although only one side plate 33 is seen in FIG. 2, another side plate 33 is provided also on the other side so that the carrier 25 as well as the stationary mirror 13 are supported on both sides. So long as the mirror 13 is correctly held in abutment with the projections 36 and 37, the reflecting surface of the mirror and the rail 35 are parallel to each other. When the rollers 32 and 33 move rolling along the rail 35, the second and third mirrors 14 and 15 carried on the support 25 move on a plane substantially parallel with the reflecting surface of the stationary mirror 13.

The mirror carrier 25 is connected with the drum-driving motor through a wire (not shown). When the motor is started to drive the photosensitive drum 21, the carrier 25 is also moved to move the mirrors 14 and 15 synchronously with the drum 21.

In the shown embodiment, the moving direction of the mirrors 14 and 15 is substantially parallel to the reflecting surface of the mirror 13. If it is desired to change the inclination angle of the mirror 13 to an angle larger or smaller than 45° while inclining the screen a little, the moving direction of the mirrors 14 and 15 may be so selected as to form a determined angle relative to the reflecting surface of the stationary mirror 13.

The angle the second and third mirrors 14 and 15 form is not limited to 45° only. It may be 90°. In this case, however, the second and third mirrors as a unit must be moved for scanning at a speed of ½ of the peripheral speed of the photosensitive drum.

Further, it is to be understood that the number of reflecting mirrors in the optical path for the reader mode and that for the printer mode is never limited to the number shown above. In each the optical path there may be arranged reflecting mirrors more than two.

The moving direction of the second and third mirrors is not limited to 45° only, but the direction may be selected arbitrarily so long as the second and third mirrors move within the optical path formed between the moving mirror 12 and the stationary mirror 13 for the reader mode.

In the above-shown embodiment, the first mirror 11 which is in the printer optical path in the printer mode, is fixed. The second and third mirrors 14 and 15 move to perform the slit scanning exposure. This construction brings about the following advantages:

(1) Since the first mirror is stationary, it is no longer necessary to use a reflecting mirror of high surface precision as the first mirror even when it is positioned close to the focusing lens. The adverse effect on the image quality by the mirror surface can be minimized accordingly.

(2) The first mirror need not be a large mirror even when it is placed near the focusing lens. Since a small mirror can be used as the first mirror, it is possible to realize an inexpensive and compact apparatus as a whole.

(3) It is possible to lessen the adverse effect on the image quality by the oscillation of the respective mirrors, if occurred.

(4) The first mirror which is used common in the reader optical path and in the printer optical path, remains still and, therefore, no variation occurs in the optical axis of the reader optical path. The second and third mirrors need not be stopped accurately at determined positions. In the reader mode, the image is always correctly projected on the determined area.

As will be understood from the foregoing, the present invention has many effects.

Firstly, according to the invention, the first reflection member may be a small reflecting mirror of not so high surface precision. This permits reduction of the size of the apparatus as a whole. In addition, the adverse effect on the image quality by the generation of oscillation can be minimized.

Two scanning reflection members are moved as a unit along the optical path between the optical path changeover reflection member and the reflection member for reader formed in the reader mode. Therefore, the space for the reader optical path can very effectively be utilized, which enables a further reduction of the size of the apparatus as a whole. Furthermore, the moving direction of the two scanning reflection members can be determined precisely relative to the reflection member for reader to form a desired angle therebetween. Therefore, the alignment of the optical axis between the reader section and the printer section can be attained easily.

No particular driving mechanism is needed to drive the optical path changeover reflection member which is very significant for the simplification of the apparatus. It has a further merit that even when the scanning reflection member runs away accidentally, the apparatus can not be damaged by it.

Figure 3:
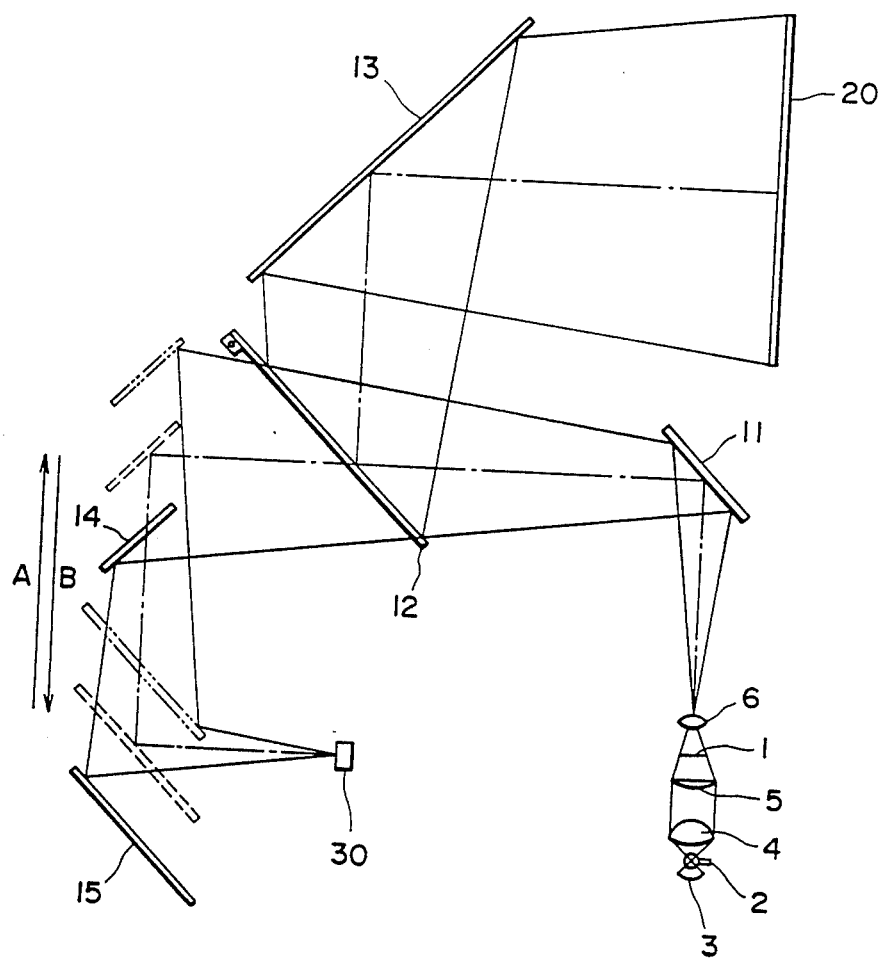
FIG. 3 is a schematic view of another embodiment of the reader-printer.

FIG. 3 shows a second embodiment of the invention. Like reference characters to the above first embodiment represent the same or corresponding members.

Referring to FIG. 3, the second and third reflecting mirrors 14 and 15 are so arranged as to form an angle of 90° therebetween. A one-dimensional image sensor 30 is located at the image position in the exposure section. The image sensor is composed of photo-electric elements such as CCD. It converts an image into an electrical signal.

In the printer mode, the second and third mirrors 14 and 15 move together in the direction of arrow B to carry out scan-exposure of the image of a film on the image sensor 30 serially in stripe sections.

The image sensor in the exposure section may be replaced by a photosensitive drum. In this case, the second and third mirrors 14 and 15 must be moved at a speed of ½ of the peripheral speed of the drum.

The image signal generated from the image sensor 30 is signal-processed and then introduced into a printer such as laser beam printer to form a copy of the image.

It is not always necessary to move the second and third mirrors together as a unit. They may be moved independently of each other and in different directions as desired.

Figure 4:
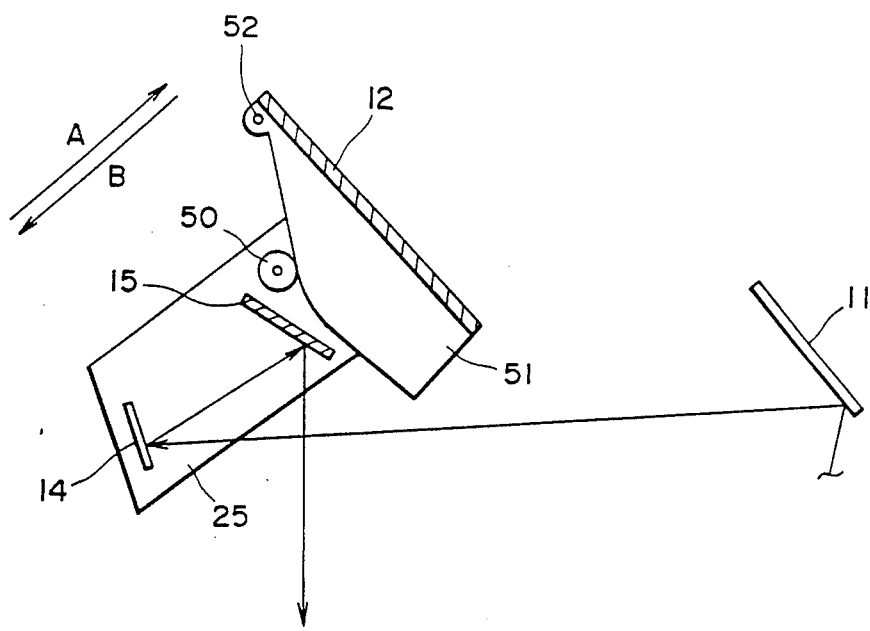
FIG. 4 is a sectional view showing another embodiment of the mirror-moving mechanism.

FIG. 4 shows a modification of the mechanism for moving the optical path changeover mirror.

A carriage 25 has a roller 50 rotatably mounted thereon. The second mirror 12 is fixed on a cam plate 51 which is rotatable about a pivot 52. The cam 51 is kept in contact with the roller 50.

When the carriage 25 moves in the ascending direction of arrow A, the cam plate 51 is rotated counterclockwise through the contact between the cam 51 and the roller 50. By the ascending movement of the carriage 25 the mirror 12 is retracted to a position out of the image projection light path.

Figure 5:
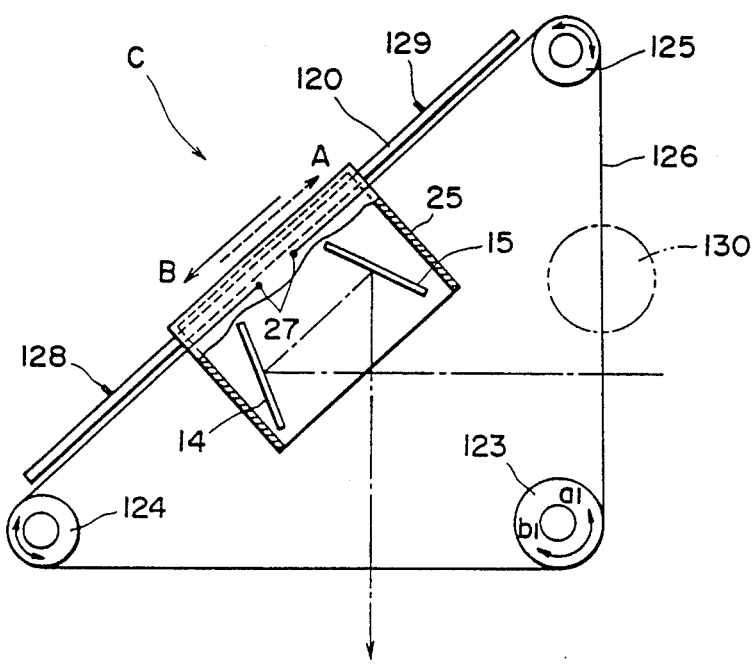
FIG. 5 is a sectional view showing a further embodiment of the mirror-moving mechanism.
Figure 6:
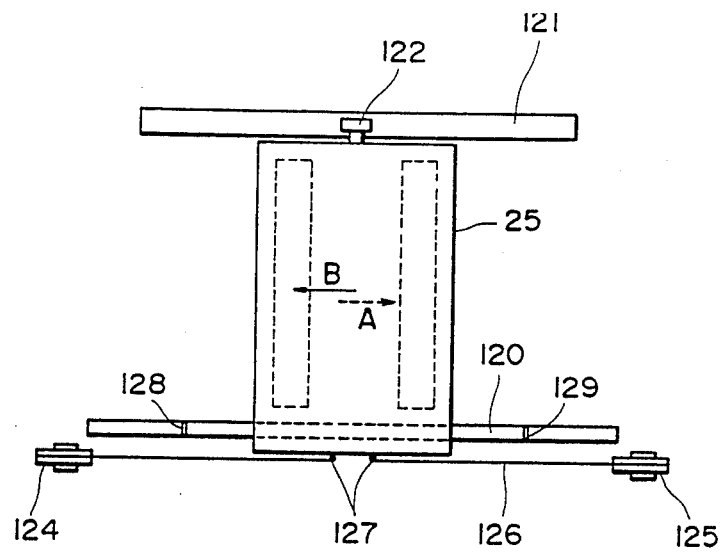
FIG. 6 is a view of the mechanism looking in the direction of arrow C in FIG. 5.
Figure 7:
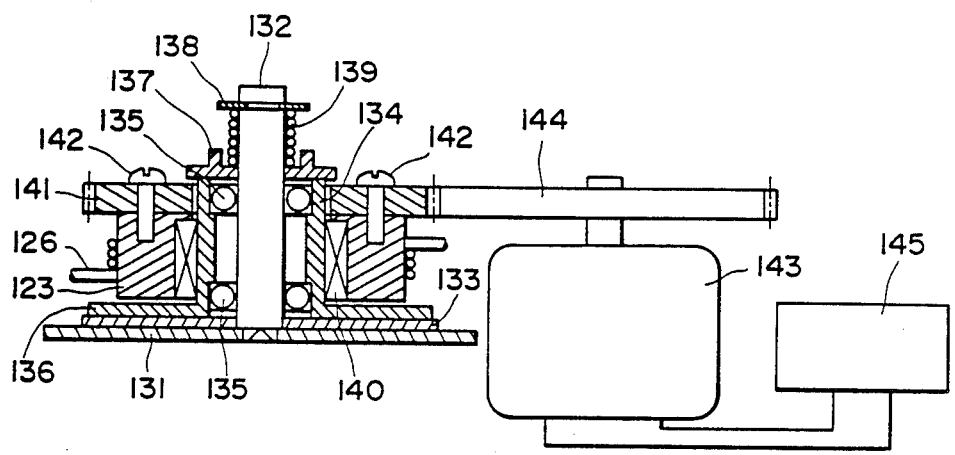
FIG. 7 is a longitudinal sectional view of the essential part of the mechanism as shown in FIG. 5.

FIGS. 5 to 7 show another embodiment of the mechanism for moving the scanning mirrors.

In FIGS. 5 and 6, the carriage 25 is guided by guide members 120 and 121. The guide members are fixed on a stationary part of the apparatus (not shown). The two guide members 120 and 121 are disposed 45° inclined relative to the vertical and extend parallel to each other. The guide member 120 is formed as a guide rod passing through the carriage 25 to support one side of the carriage. The other guide member 121 is formed as a guide rail along which a roller 122 of the carriage 25 can move and which supports the carriage on the other side. Therefore, the carriage 25 can move in the descending direction B and in the ascending direction A along the guide members 120 and 121.

A tension wire 126 extends around pulleys 123, 124 and 125 of which the pulley 123 is driven by a reversible motor and the remaining pulleys 124 and 125 are idlers. The idler 125 is at the upper end of the guide rod 120 and the idler 124 is at the lower end of the guide rod. Two ends 127 of the tension wire 126 are anchored at two points on the outer side wall of the carriage 25 on the side of the guide rod 120. With this construction, when the pulley 123 is driven into rotation in the forward direction $a_1$, the carriage 25 moves in the descending direction B along the guide members 120 and 121. When the pully 123 is driven in reverse direction $b_1$, the carriage 25 moves in the ascending direction A.

In this embodiment, a moving optical component, that is, the carriage 25 is moved along the sloped guide members 120 and 121. As readily understood, a spontaneous descending force is always acting on the carriage 25 by the partial force of weight (gravity). If no means is provided for cancelling the descending force by gravity, the descending force by gravity will be added to the driving force applied to the carriage 25 by the forwardly ($a_1$) rotating pulley 123 through the wire 126. Since the pulley-driving motor is given no force for moderating its own rotation, the rotation of the pulley-driving motor will be accelerated by the descending force by gravity of the carriage 25.

Consequently, the descending speed of the carriage 25 is gradually increased so that the running speed of the carriage carrying the scanning mirrors and the peripheral speed of the photosensitive drum 21 will get out of synchronism, which may cause some distortion of the copied image. Furthermore, when the carriage 25 is topped at the end of the descending course by a stopper 123, a great shock will be produced due to the acceleration. By the way, the reference numeral 129 in FIGS. 5 and 6 denotes a stopper at the end of the ascending course.

The above problem of out-of-synchronism may be solved by driving the drum 21 and the carriage 25 by a common motor. If the driving force for the carriage 25 is taken from the same motor from which the rotating force for the drum 21 is taken, the synchronism between the descending speed of the carriage and the peripheral speed of the rotating photosensitive drum may be maintained. However, this solution brings about another problem. Since, in this case, the peripheral speed of the photosensitive drum is accelerated, there may be produced the problem such as under-exposure or undercharge which leads to the formation of low quality images.

As another solution, it may be considered to cancel the descending force by gravity and make constant the descending speed of the mirror carriage 25 by use of a counter-weight. For example, as suggested by phantom in FIG. 5, a counter-weight 130 which is substantially in balance with the descending force by gravity, may be added to the pulley wire at the vertical segment 126. However, in this case, the weight which the balance weight 130 practically has to have is estimated to be over 1000 g, which will produce a difficult problem. The idler pulley 125 has to bear the large load of the weight 130 in addition to the weight of the mirror carriage 25. Such a large weight load is against the desired durability of the apparatus. Furthermore, the balance weight 130 has a considerably large volume, which renders the apparatus large as a whole. If the balance weight is made of a material of large specific weight to reduce the volume, the manufacturing cost of the apparatus will increase considerably.

As a still further solution it may be considered to cancel the descending force by gravity of the carriage 25 by use of a friction member. However, if such a friction member is once provided in the driving system, the frictional force works also as a resistance force against the ascending force when the mirror carriage 25 is moving in the ascending direction A. Therefore, if this solution is adopted, a large torque motor is needed, which leads to a large and expensive apparatus.

According to a preferred embodiment, the above-mentioned problem is solved by providing one-way load means in the driving system.

When the driving system is not operating and when the driving system is operating in the direction to move the mirror carriage in the descending direction, said one-way load means gives the driving system a counter force which practically cancels the descending force by gravity of the carriage moving along the guide members. When the driving system is operating in the direction to move the carriage in the ascending direction, said one-way load means does not give the counter force to the driving system.

FIG. 7 shows an embodiment of the mirror carriage driving mechanism provided with such one-way load means.

Referring to FIG. 7, the apparatus has a chassis plate 131 having a shaft 132 fixed on the inside surface of the plate. Near the shaft on the inside surface of the chassis plate there is a friction plate 133 fixed by bonding. A hollow core 134 is rotatably mounted on the shaft 132 through a set of bearings 135 (ball bearing). The hollow core has a flange 136 integrally formed with the core. The flange 136 is in contact with the friction plate 133 in the manner of surface-to-surface.

On the opposite side to the flange 136, a friction plate 137 is loosely mounted on the shaft 132. At the free end, the shaft has a stop ring 138. A coil spring 139 is disposed between the friction plate 137 and the stop ring 138. By the force of the coil spring 139, the hollow core is always pressed against the inner surface of the chassis plate 131 through the friction plate 137. The surface of the flange 136 is abutted against the surface of the friction plate 133. The friction plate 137 on the side opposite to the flange 136 is abutted against the end surface of the hollow core. Thus, the follow core is subjected to the resistance to the rotation about the shaft 132 by the frictional force of the friction plates 133 and 137.

The reversible pulley 123 previously mentioned with reference to FIG. 5 is mounted on the hollow core 134 through a one-way clutch 140. The wire 126 is wound round the pulley 123 several turns.

A gear 141 is coaxially fixed to one side surface of the pulley 123 by screws 142. A gear 144 is in mesh with the gear 141 coaxially connected with the pulley 123. The gear 144 is mounted on the rotating shaft of a reversible motor (DC motor) 143. The rotation of the motor 143 is controlled by a motor drive circuit 145 synchronously with the control of rotation of the photosensitive drum 21.

The one-way clutch 140 used in the embodiment works only when the pulley 123 is rotated in the forward direction (rotational direction $a_1$) to move the mirror carriage 25 in the descending direction B. In this clutch working direction, the pulley 123 and the hollow core 134 are united together by the clutch. On the contrary, when the pulley 123 is moved in the reverse direction (rotational direction $b_1$) to move the mirror carriage 25 in the ascending direction A, the clutch does not work. In this clutch non-working direction, the pulley 123 is allowed to idly turn round the hollow core 134.

The manner of operation of the embodiment is as follows:

When a slit exposure is carried out on the photosensitive drum 21, the motor drive circuit 145 drives the motor 143 into forward rotation. Through gears 144 and 145, the pulley 123 is rotated in the forward direction $a_1$. The mirror carriage 25 is moved in the descending direction B through the wire 126. Since, at this step, the rotational direction of the pulley 123 is the clutch working direction of the one-way clutch 140, the pulley 123 and the hollow core 134 are rotated as a unit.

As previously described, a resistance force against rotation is being applied to the hollow core 134 by the frictional force of the friction plates 133 and 137. This rotation-resisting force acts on the pulley 123 as a counter force to the forward rotation of the pulley and therefore to the driving force for moving the carriage 25 in the descending direction.

By suitably presetting the spring force of the coil spring 139, the counter force, that is, the rotation-resisting force is adjusted to a value which substantially cancels the descending force by gravity due to the partial force of the carriage weight. Therefore, no accelerated descending force can act on the carriage 25. The carriage moves in the descending direction along the sloped guide members 120 and 121 always stably at a constant speed determined by the forward rotation of the motor 143 (at the speed corresponding to the peripheral speed of the rotating photosensitive drum 21).

When the mirror carriage 25 reaches the end point of the descending course, the drive circuit 145 reverses the motor 143 to move the carriage 25 in the ascending direction A. Through the gears 144 and 141, the pulley 123 is rotated in the reverse direction $b_1$ and the carriage 25 is moved through the pull wire 126. Since the rotational direction of the pulley 123 this time is the non-working direction of the one-way clutch 140, the pulley 123 idly rotates about the hollow core 134. Therefore, the rotation-resisting force by the friction plates 133 and 137 does not act on the pulley at this step. Accordingly, no excess load is on the driving system during the ascending movement of the carriage 25. Therefore, it is possible to move the carriage in the ascending direction with a small torque.

When the mirror carriage 25 reaches the end of the ascending course, the electric current to the motor 143 is cut off through the drive circuit 145. Since the motor 143 has no force for preventing its own rotation, the carriage 25 intends to move along the sloped guide members 120 and 121 in the descending direction due to the descending force by gravity. The descending force tends to rotate the pulley 123 in the forward rotational direction $a_1$. This rotational direction of the pulley is the clutch working direction. Therefore, at the time, the one-way clutch 140 is actuated to unit the pulley 123 and the hollow core 134 together. The rotation-resisting force working on the hollow core substantially counterpoises the descending force by gravity. Consequently, the descending force by gravity of the carriage is cancelled by the counter force. The carriage is prevented from moving in descending direction by the descending force by gravity and is held still at the end point of the ascending course in a stable manner.

While the present invention has been particularly shown and described with reference to preferred embodiments thereof, obviously various changes and variations are possible therein. For example, as the motor 143 an AC motor may be used in place of the DC motor while providing such clutch means effective in both directions of forward rotation and reversed rotation. Also, the one-way clutch 140 may be replaced by an electro-magnetic clutch. As another modification, the shaft 132 may be made rotatable about its own axis while omitting the hollow core 134.

While the scan-exposure has been carried out at the step of the descending movement of the mirror carriage 25 in the above embodiments, it is to be understood that within the scope of the invention it is also possible to rotate the photosensitive drum 21 in the opposite direction to that in the above embodiment and carry out the scan-exposure at the step of the ascending movement of the mirror carriage. In any case, by using the driving mechanism as shown in the above embodiment of the invention, the mirror carriage (or mirror supporting plate) 25 can be moved in the descending direction without acceleration and can be stopped at the end of the descending course without shock after scan-exposure.

What we claim is:
1. A projection copying apparatus comprising:
an image-forming lens;

a first reflection member disposed opposed to said image-forming lens to reflect the light transmitted through the lens;

a second reflection member disposed in an optical path of reflection light by said first reflection member and movable in a direction transverse to said reflection light path;

a third reflection member disposed in an optical path of reflection light by said second reflection member and movable in the same direction as said second reflection member, an optical path of reflection light by said third reflection member intersecting the optical path of incident light to said second reflection member;

a photosensitive medium for receiving the light reflected by the third reflection member; and driving means for moving said second reflection member and said third reflection member in the direction inclined at a predetermined angle with respect to the optical path of the incidence light to said second reflection member.

2. A projection copying apparatus according to claim 1, wherein said apparatus further comprises a fourth reflection member for moving into and moving out from the reflection light path of said first reflection member and wherein said fourth reflection member is moved into said reflection light path, there is formed a reader optical path for projecting an image on a screen and when said fourth reflection member is retracted from said reflection light path, there is formed a printer optical path for projecting the image on the photosensitive medium.

3. A projection copying apparatus according to claim 2, wherein second and third reflection members move in the same direction and can move into and move out from the reader optical path.

4. A projection copying apparatus according to claim 2, wherein said apparatus further comprises interlocking means for moving said fourth reflection member interlocking with the movement of said second and third reflection member.

5. A projection copying apparatus according to claim 1, wherein said second and said third reflection member are located at an angle of 45 degrees to each other.

6. A projection copying apparatus according to claim 5, wherein said second and third reflection members are mounted on a movable support member, said support member being moved in said inclined direction by said drive means.

7. A projection copying apparatus according to claim 6, wherein said apparatus further comprises load means for providing said support member with a counter force when said support member is stopping and moving in the descending direction and for cancelling the counter force when said support member moves in the ascending direction, the magnitude of said counter force being at a level which substantially cancels the descending force of said support member due to the partial force of gravity of said support member.

8. A projection copying apparatus according to claim 7, wherein said load means includes means for applying a frictional resistance to said support member and clutch means for connecting said support member with said resistance applying means and disconnecting the former from the latter.

9. A reader-printer in which the operation mode can be changed over between reader mode for observing an image on a screen and printer mode for reproducing the image on a photosensitive medium, said reader-printer comprising:

a first reflection member disposed opposed to an image-forming lens to receive the light from said lens;

a movable second reflection member for receiving the light reflected by said first reflection member;

a movable third reflection member for receiving the light reflected by said second reflection member, an optical path of reflection light by said third reflection member intersecting an optical path of the incident light to said second reflection member;

a fourth reflection member for moving into and moving from between said first and second reflection members, said fourth reflection member being moved into the reflection light path of the first reflection member to form an optical path for projecting the image on the screen by said first and fourth reflection members in the reader mode and being retracted from said reflection light path to form an optical path for projecting the image on the photosensitive medium by said first, second and third reflection members in the printer mode; and driving means for moving said second and third reflection members in the direction across the reflection light path of said first reflection member.

10. A reader-printer according to claim 9, wherein said second and third reflection members are located at an angle of 45 degrees to each other, and are movable in the same direction.

11. A reader-printer according to claim 10, wherein said second and third reflection members are moved to come in and come back from the reader optical path formed by said fourth reflection member.

12. A reader-printer according to claim 9, wherein said apparatus further comprises interlocking means for moving said fourth reflection member interlocking with the movement of said second and third reflection members.

13. A reader-printer changeable into a reader mode for projecting an image onto a screen and into a printer mode for projecting the image onto a photosensitive member, comprising:

a first reflection member having two positions for defining the reader mode and printer mode, said first reflection member being positioned in the reader mode at a first position for projecting the image toward the screen, with the first position interrupting an optical path of the image, and being positioned at a second position out of the optical path in the printer mode;

a second reflection member for scanning the image on the photosensitive member, said second reflection member being movable between one side of the first position and the other side of the first position;

a first supporting member supporting said first reflection member and being freely rotatable about an axis;

a second supporting member supporting said second reflection member and being linearly movable in a direction traversing the first position of said first reflection member, and said second supporting member having a cam surface in contact with said first supporting member, wherein said first supporting member is rotated through sliding contact with said cam surface as said second supporting member moves in the linear direction to move said first reflection member between the first position and the second position; and driving means for moving said second supporting member.

14. A reader-printer according to claim 13, wherein said second reflection member moves in a direction inclined at a predetermined angle with respect to an optical axis.

15. A reader-printer according to claim 14, wherein said first reflection member has a reflection surface facing opposite said second reflection member, and said second reflection member has a reflection surface facing opposite said first reflection member, and said cam surface is engaged with said first support member opposite to said reflection surface of said first reflection member.

16. A reader-printer according to claim 15, further comprising a third reflection member, and a third supporting member for supporting said third reflection member, wherein said third reflection member has a reflection surface facing said second reflection member, and when said first reflection member is placed at the first position, said third reflection member is placed on the same side of a reference position as said second reflection member to scan the image by movement of said second and third reflection members.

17. A reader-printer changeable into a reader mode for projecting an image onto a screen and into a printer mode for projecting the image onto a recording medium, comprising:

first reflection means for receiving image light and reflecting it along an optical path;

second reflection means being movable to a first position in the optical path for receiving image light from said first reflection means to form a reader optical path, and movable to a second position out of the optical path for forming a printer optical path;

third reflection means for receiving, when said second reflection means is moved to the second position, image light from said first reflection means to scan the image to a recording medium, said third reflection means being movable to a rest position at which said third reflection means is placed at one side of the first position and out of the reader optical path and movable to a scanning start position at the other side of the first position; and a supporting member supporting the third reflection means and being movable in a direction crossing the optical path of light reflected by the first reflection means, said supporting member having a cam surface in contact with said second reflection means and said second reflection means being rotated while in sliding contact with said cam surface as said supporting member moves in the crossing direction, so as to move said second reflecting means between the first position and the second position; and drive means for moving said support member.

* * * * *

UNITED STATES PATENT AND TRADEMARK OFFICE
CERTIFICATE OF CORRECTION

PATENT NO. : 4,947,213

DATED : August 7, 1990

INVENTOR(S) : Shinji Murata, et al.

It is certified that error appears in the above-identified patent and that said Letters Patent is hereby corrected as shown below:

On the Title page

[56] REFERENCES CITED:

"4,367,033 10/1983 Watanabe" should read
--4,367,033 1/1983 Watanabe--.

COLUMN 11:

Line 20, "incidence" should read --incident--.

Line 41, "member." should read --members.--.

Line 43, "member" should read --members--.

Signed and Sealed this

Twenty-third Day of February, 1993

Attest:

STEPHEN G. KUNIN

Attesting Officer

Acting Commissioner of Patents and Trademarks